(12) United States Patent
Yokoshi

(10) Patent No.: US 7,162,492 B2
(45) Date of Patent: Jan. 9, 2007

(54) APPARATUS AND METHOD FOR MANAGING STATE OF EXTERNAL APPARATUS

(75) Inventor: Noriyuki Yokoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 10/075,642

(22) Filed: Feb. 13, 2002

(65) Prior Publication Data

US 2003/0046306 A1 Mar. 6, 2003

(30) Foreign Application Priority Data

Aug. 30, 2001 (JP) .............................. 2001-262358

(51) Int. Cl.
*G06F 17/30* (2006.01)

(52) U.S. Cl. ................. 707/103 R; 707/200; 707/205; 707/203; 707/204; 707/10

(58) Field of Classification Search ................. 707/10, 707/100, 3, 4, 2, 103, 200, 203–205, 103 R; 709/206, 204, 200, 225
See application file for complete search history.

(56) References Cited

U.S. PATENT DOCUMENTS

| | | | | |
|---|---|---|---|---|
| 5,848,415 A | * | 12/1998 | Guck | ........................... 707/10 |
| 5,907,677 A | * | 5/1999 | Glenn et al. | ................. 709/206 |
| 6,173,289 B1 | * | 1/2001 | Sonderegger et al. | ... 707/103 R |
| 6,236,996 B1 | * | 5/2001 | Bapat et al. | .................... 707/9 |
| 6,374,256 B1 | * | 4/2002 | Ng et al. | ................. 707/103 R |
| 6,459,779 B1 | * | 10/2002 | Wardin et al. | ......... 379/112.01 |
| 6,594,656 B1 | * | 7/2003 | Arlein et al. | ................... 707/4 |
| 6,735,615 B1 | * | 5/2004 | Iwayama et al. | ........... 709/204 |

FOREIGN PATENT DOCUMENTS

| | | |
|---|---|---|
| JP | 10011347 | 1/1998 |
| JP | 10210034 | 8/1998 |
| JP | 11120103 | 4/1999 |
| JP | 2000224262 | 8/2000 |
| JP | 2001075899 | 3/2001 |

* cited by examiner

*Primary Examiner*—Cam-Y Truong
(74) *Attorney, Agent, or Firm*—Katten Muchin Rosenman LLP

(57) ABSTRACT

An apparatus for managing a state of an external apparatus connected thereto includes a database storing the state of the external apparatus, a managed object (MO) managing the state of the external apparatus, and a control interface for the MO performing outer control from the database. The MO is provided in the database and realized by an application, and the interface is provided in the MO.

18 Claims, 13 Drawing Sheets

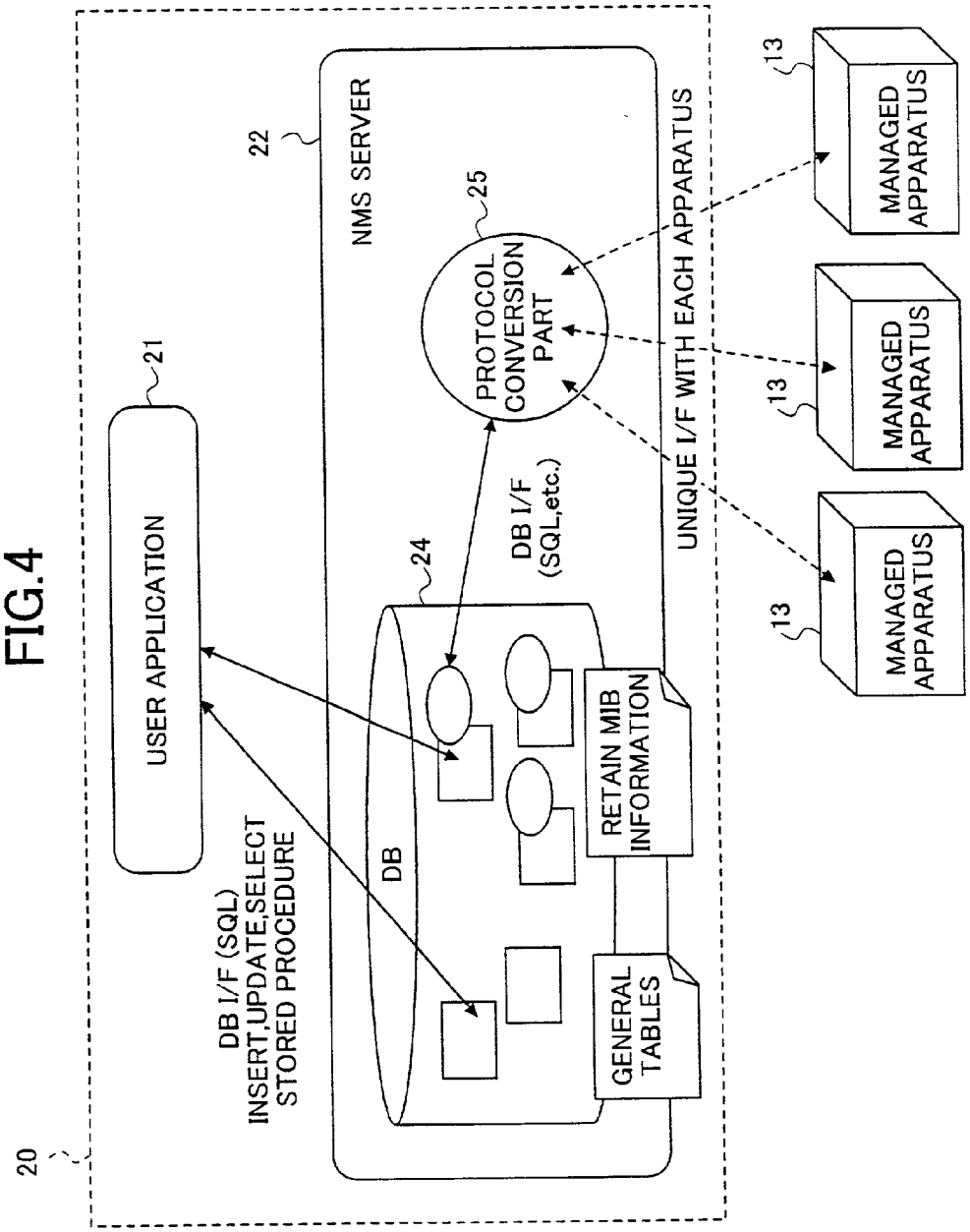

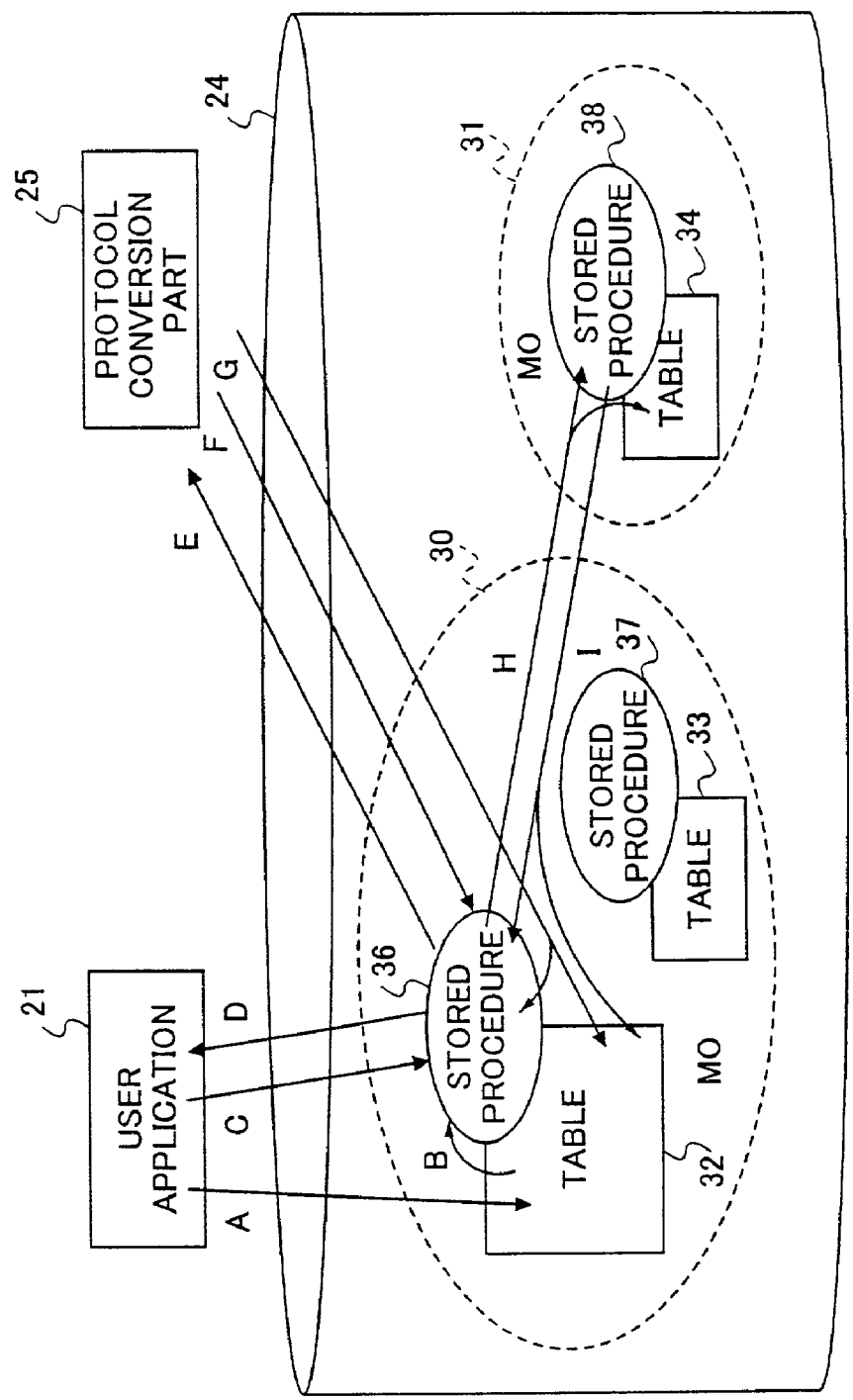

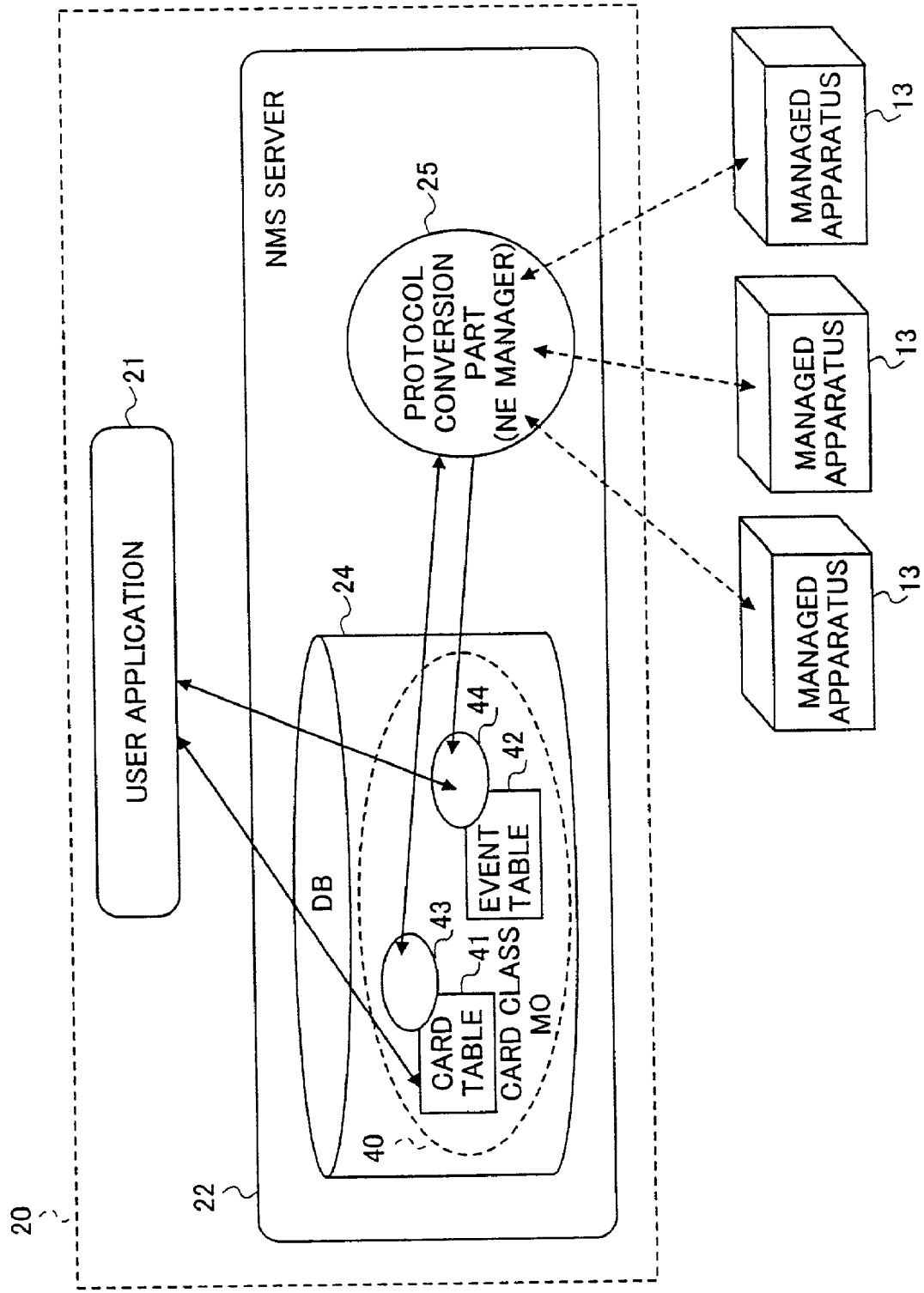

FIG.7A

| COLUMN NAME | TYPE | REMARKS |
|---|---|---|
| CARD_ID | NUMBER(10) | PRIMARY KEY IDENTIFYING EACH PACKAGE |
| CARD_NAME | VARCHAR2(16) | NAME INFORMATION OF PACKAGE(EXISTING ONLY IN DB) |
| ALARM_INH | NUMBER(2) | FLAG AS TO WHETHER TO MONITOR PACKAGE |
| ALARM_STATE | NUMBER(2) | STATE OF ALARM OF PACKAGE |

FIG.7B

| COLUMN NAME | TYPE | REMARKS |
|---|---|---|
| EVENT_ID | NUMBER(10) | PRIMARY KEY IDENTIFYING EACH PACKAGE |
| EVENT_TIME | DATE | TIME OF OCCURRENCE OF EVENT |
| CARD_ID | NUMBER(2) | CARD_ID INFORMATION CORRESPONDING TO EVENT |
| EVENT_MODE | NUMBER(2) | INFORMATION ON OCCURRENCE OF OR RECOVERY FROM FAILURE |
| EVENT_STATUS | NUMBER(2) | INFORMATION MANAGING STATE OF NEW EVENT |

APPARATUS AND METHOD FOR MANAGING STATE OF EXTERNAL APPARATUS

BACKGROUND OF THE INVENTION

1. Field of the Invention

The present invention generally relates to apparatuses and methods for managing the state of an external apparatus, and more particularly to an apparatus and method for managing the state of an apparatus which apparatus and method realizes a managed object (MO), which is a function of managing the state of an apparatus, by an application and retains the state of the external apparatus in a database.

2. Description of the Related Art

Conventionally, a managed object (MO), which is a function of managing the state of an apparatus has been realized by a general application and information required to be retained inside a computer such as a workstation (WS) or a personal computer (PC) has been retained by using a database. According to this conventional method, a user is required to perform control or obtain information by using the application managing the MO and protocols such as the common management information protocol (CMIP) or the simple network management protocol (SNMP).

On the other hand, in the case of managing or controlling the state of a communication device or a computer, information not directly related to the managed apparatus, such as user information, is also required in addition to simple management of the apparatus, thus making a database retaining such user information essential.

FIG. 1 is a block diagram showing a network management system employing the conventional method. In FIG. 1, a network management system (NMS) 10 is composed of a user application 11 such as a graphical user interface (GUI) and a computer 12 such as a WS or a PC, and manages apparatuses to be managed (managed apparatuses) 13 such as transmission apparatuses. For convenience of description, only one of the managed apparatuses 13 will be referred to in the following description.

In order to handle information on the managed apparatus 13, it is necessary to retain the information as an MO 15 in the computer 12 by using databases (DBs) 16 and 17 for retaining the information inside the MO 15. The necessity of retaining the information is as follows:

First, if the information set in the managed apparatus 13 is retained only thereby without being retained by the NMS 10, it is difficult to restore the managed apparatus 13 to its original state when the information retained by the managed apparatus is lost.

Secondly, if a method is employed by which method the information set in the managed apparatus 13 is obtained therefrom every time the NMS 10 reads out the information, the NMS 10 takes time in performing control and reading due to an interface protocol with the managed apparatus 13. Since time required in reading out the set information can be reduced by the NMS 10 retaining the set information, the set information is retained in the database 16 as shown in FIG. 2.

Thirdly, if the managed apparatus 13 can asynchronously notify the NMS 10 of information on an internal change of the managed apparatus 13, such as failure information, switching information of a redundant configuration part, and an operating state, the NMS 10 can always check the state of the managed apparatus 13 without obtaining the information therefrom by retaining the event in the NMS 10 as shown in FIG. 3. Thereby, processing time can be reduced.

For the above-described reasons, an application for monitoring and controlling the managed apparatus 13 defines the MO 15 by modeling and retains a variety of information in the NMS 10 by using the database 16.

However, the NMS 10 does not only handles information transmitted by way of the MO 15. As is often the case, the NMS 10 directly handles information retained in the database 17, for instance, general information such as a place where the managed apparatus 13 is provided. Therefore, the user application 11 is required to use two interfaces with the computer 12; one by way of the MO 15 and the other directly with the database 17.

According to the conventional method and system, generally, a database is used to retain and manage information handled by a user application. However, a normal database only manages information stored by a user, and is prevented from managing actual information on a managed apparatus unless the user stores the information. The information may not represent the actual state of the managed apparatus depending on timing at which the user stores the information. That is, the interface of the database cannot process the actual information on the managed apparatus unless the information is once stored in the database.

Further, in order to manage the state of a communication device or a computer, it is necessary to read out the actual state of the apparatus or set a variety of control information in the actual apparatus. In order to realize such a function, an application shall be installed as an MO. This requires the user application to use a protocol different from an interface with the database (an access by a structured query language (SQL) statement), such as the SNMP or the CMIP. As a result, the user application is required to have many access interfaces installed therein. That is, an interface for accessing the actual apparatus such as the managed apparatus is required in addition to the access interface to the database, thus increasing costs.

Further, in the case of realizing a large-scale system, generally, the system is formed by providing a server including the MO and a server including the database separately from each other for processing load sharing. However, according to this method, the server including the database is accessed via the server including the MO from the user application in order to obtain the actual information on the managed apparatus, thus requiring processing time longer than that required in directly accessing the database. In a system where real-time processing is required, such as a system for monitoring and controlling a managed communication device, it is necessary to reduce processing time. Therefore, a delay in processing causes a problem.

Further, in the case where the MO and the database is provided separately, in order to realize transaction processing performing, for instance, exclusive access control of information, a locking operation, cancellation of an operation, and recovery, a transaction function is required to be installed separately in the MO-side application, though the transaction function of the database is also available. This increases the cost of creating the application.

SUMMARY OF THE INVENTION

It is a general object of the present invention to provide an apparatus and method for managing the state of an external apparatus in which apparatus and method the above-described advantages are eliminated.

A more specific object of the present invention is to provide an apparatus and method for managing the state of an external apparatus by which apparatus and method an MO and a managed apparatus can be accessed by accessing a database from a user application.

The above objects of the present invention are achieved by an apparatus for managing a state of an external apparatus connected thereto, the apparatus including: a database storing the state of the external apparatus; a managed object (MO) managing the state of the external apparatus, the MO being provided in the database and realized by an application; and a control interface for the MO performing outer control from the database, the interface being provided in the MO.

The above objects of the present invention are also achieved by a method of managing a state of an apparatus, the method realizing a managed object (MO) by an application and storing the state of the apparatus in a database, the MO managing the state of the apparatus, wherein the MO is provided inside the database and performs outer control therefrom via a control interface.

According to each of the above-described apparatus and method, the MO and the external apparatus can be accessed by accessing the database from, for instance, a user application connected to the database.

BRIEF DESCRIPTION OF THE DRAWINGS

Other objects, features and advantages of the present invention will become more apparent from the following detailed description when read in conjunction with the accompanying drawings, in which:

FIG. 4 is a block diagram showing a first embodiment of a network management system (NMS) according to the present invention;

FIG. 5 is a block diagram showing a configuration of an MO inside a database;

FIG. 6 is a block diagram showing a second embodiment of the NMS according to the present invention;

FIGS. 7A and 7B are diagrams showing schema definitions of a card table and an event table, respectively;

DETAILED DESCRIPTION OF THE PREFERRED EMBODIMENTS

Figure 1:
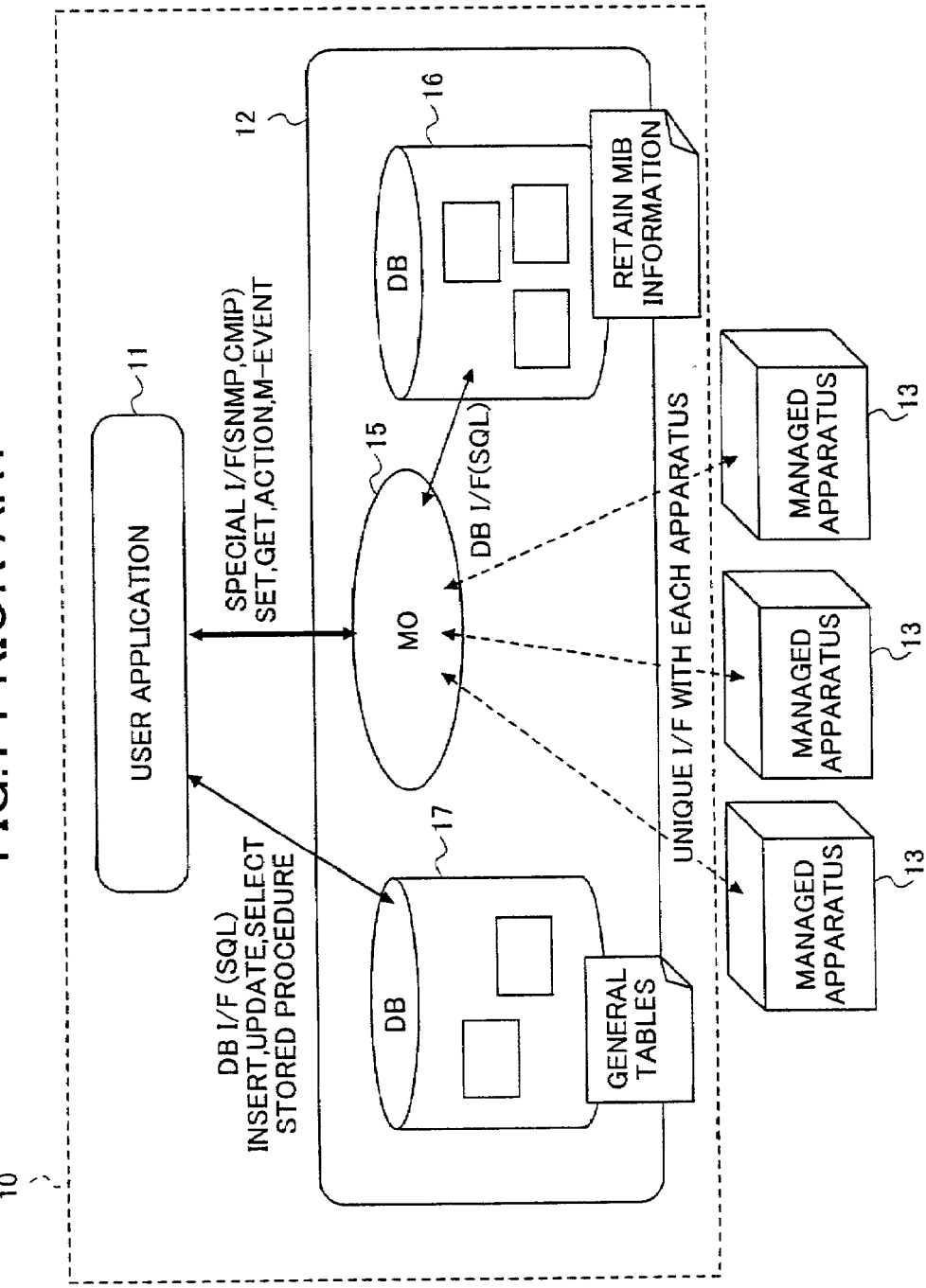
FIG. 1 is a block diagram showing a network management system employing a conventional method.
Figure 2:
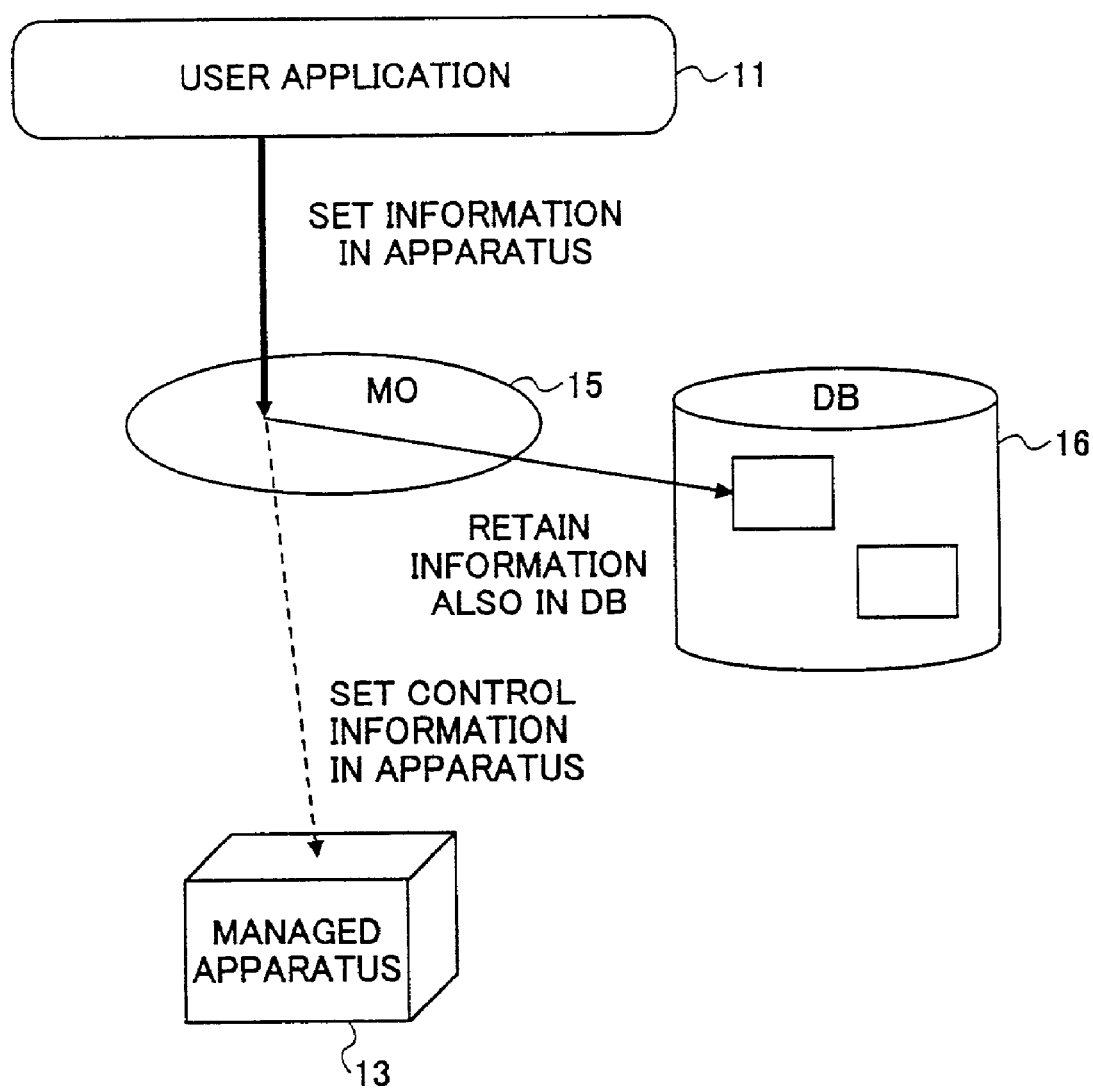
FIG. 2 is a diagram showing an information setting route from a user application to a database.
Figure 3:
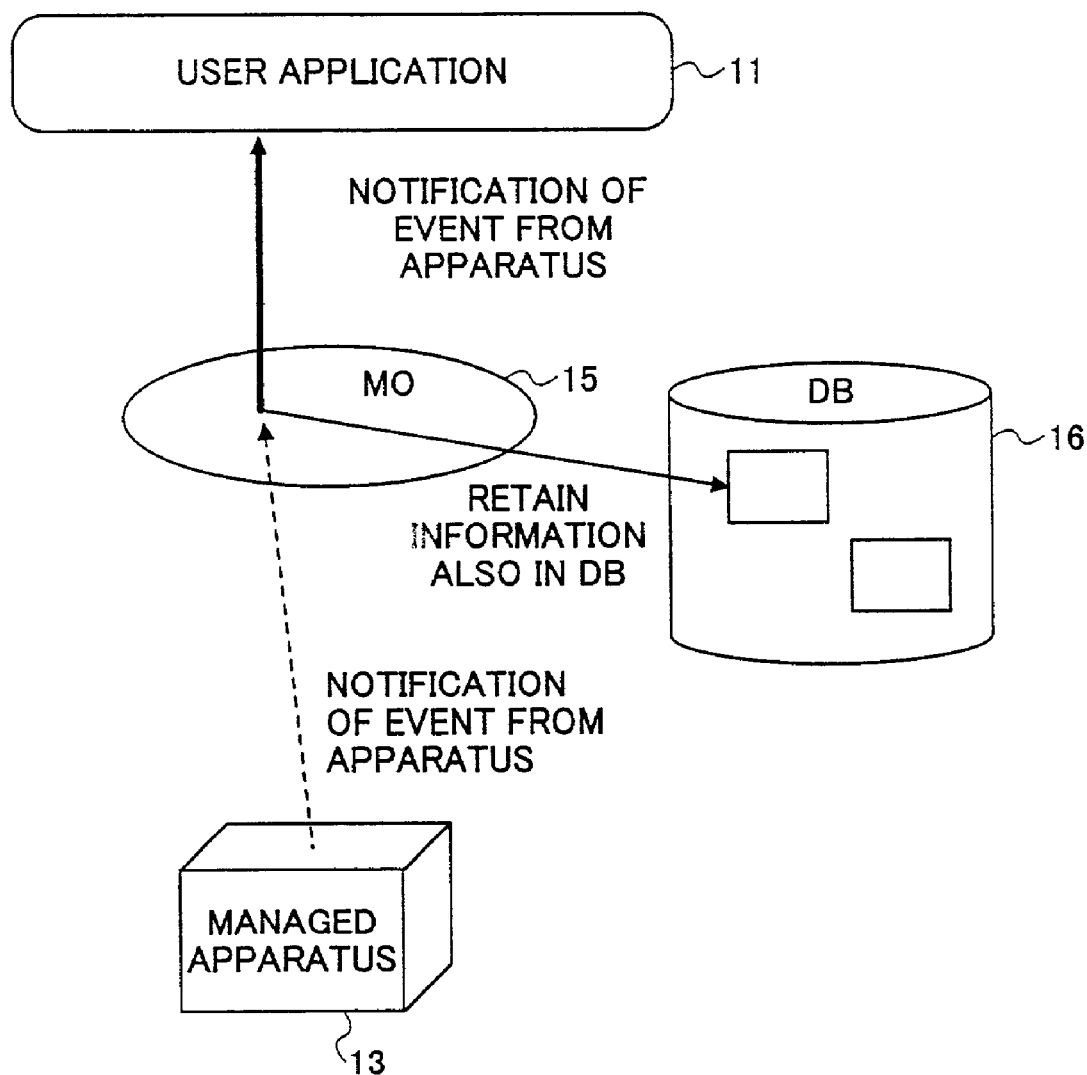
FIG. 3 is a diagram showing an event notification route from a managed apparatus to the database.

A description will now be given, with reference to the accompanying drawings, of embodiments of the present invention.

The present invention realizes a method of providing, inside a database by realizing several methods, an MO representing a managed apparatus by the SNMP or management information base (MIB) information commonly used in the field of communication. According to the present invention, the MO representing the managed apparatus can be managed on the user side in the same way as a common database is managed by providing the MO inside the database.

FIG. 4 is a block diagram showing a first embodiment of a network management system (NMS) 20 according to the present invention. In FIG. 4, the NMS 20 is composed of a user application 21 as a user, such as a GUI, and an NMS server 22, and manages managed apparatuses 13 such as transmission apparatuses. The NMS server 22 is composed of a database 24 and a protocol conversion part 25.

In the following description, basically, only one of the managed apparatuses 13 will be referred to for convenience of description.

The user application 21 displays or controls information through an MO provided inside the database 24 in order to monitor the state of the managed apparatus 13 and set a variety of parameters in the managed apparatus 13.

The MO, which is provided inside the database 24, represents the managed apparatus 13 in functional unit by modeling the managed apparatus 13, and having information and an operation for each functional unit. Thereby, the user application 21 on the user side can access the MO only by operating the database 24.

The protocol conversion part 25 performs a function of converting a communication protocol inside the NMS server 22 into a communication protocol for communicating with the managed apparatus 13 in the case of controlling the managed apparatus 13 by way of the MO based on an instruction of the user application 21. A control interface with the managed apparatus 13 is defined uniquely therefor. Further, in the present invention, the protocol conversion part 25 includes a function of serving as an interface with the MO provided inside the database 24 in addition to the function of communication protocol conversion. The main functions of the protocol conversion part 25 are as follows:

(a) Function of receiving a control message from the MO inside the database 24.

(b) Function of returning a response from the controlled managed apparatus 13 to the MO inside the database 24.

(c) Function of notifying the MO inside the database 24 of a message transmitted asynchronously from the managed apparatus 13, such as alarm information or information on a change in the inside state of the managed apparatus 13.

FIG. 5 is a block diagram showing a configuration of the MO inside the database 24. In FIG. 5, a plurality of MOs 30 and 31 are hierarchically provided inside the database 24. For instance, the MO 30 corresponds to one unit inside the managed apparatus 13 and the MO 31 corresponds to one card inside the unit.

Each of the MOs 30 and 31 includes at least one table for storing information retained thereby and may include a plurality of tables depending on the information. In FIG. 5, the MO 30 includes tables 32 and 33, and the MO 31 includes a table 34. Stored procedures 36, 37, and 38 are provided in the tables 32, 33, and 34, respectively. For instance, a method executed when the table 32 is updated and a method for instructing the table 32 to perform a batch of operations or a complicated operation are defined as the stored procedure 36. Principal methods are as follows (in the following description, "the table" refers to any of the tables 32 through 34):

(a) A method executed automatically before or after the table is updated.

(b) A method executing a batch of operations directly to the table.

(c) A method notifying the outside of the table of a change inside the table.

(d) A method exchanging messages between the tables.

Interfaces between the database 24 and the external user application 21 and protocol conversion part 25 and interfaces inside the database 24 are classified as follows (in FIG. 5, an example of each type of interfaces is referred to by the same capital letter as that used in the following description. Further, "the table" refers to any of the tables 32, 33, and 34, and "the MO" refers to either the MO 30 or 31 and "the stored procedure" refers to one of the stored procedures 36, 37, and 38, accordingly):

A. An operation for accessing the general table. By this operation, the table of the MO is referred to or updated by using a statement in SQL that is a query language. An interface A shown in FIG. 5 is an example of this type of interface.

B. An interface executed automatically when the table is updated (Insert or Update is performed). This type of interface is defined by the stored procedure as required. In terms of execution timing, this type of interface is executed either before or after the table is updated. An interface B shown in FIG. 5 is an example of this type of interface.

C. An interface for requesting the table to perform a batch of operations or a complicated operation. For instance, this type of interface is used to request the table to perform an operation indicating a plurality of records in the table or to control the managed apparatus 13 provided external to the database 24 by way of the MO. An interface C shown in FIG. 5 is an example of this type of interface.

D. An interface for notifying the user application 21 of a change effected in the table. An interface D shown in FIG. 5 is an example of this type of interface. For instance, when the protocol conversion part 25 recognizes alarm information from the managed apparatus 13 and the information is stored in the database 24, the interface D realizes an event of notifying the user application 21 of the stored information through the stored procedure 36 by using the interface B.

E. An interface (for instance, an interface E shown in FIG. 5) for notifying the protocol conversion part 25 of operation information when control of the managed apparatus 13 is requested through an interface (for instance, the interface C) with the user application 21 or an operation request made by the other MO (for instance, an interface I).

F. An interface (for instance, an interface F shown in FIG. 5) for returning the result of an operation request when the operation request is made to the protocol conversion part 25 through, for instance, the interface E.

G. An operation for storing in the MO inside the database 24 information on a change inside the managed apparatus 13, such as alarm information or a state change notification, which information transmitted asynchronously from the managed apparatus 13. This type of interface may directly update the table or utilize the stored procedure provided in the table to update the table. An interface G shown in FIG. 5 is an example of this type of interface.

H. An interface used for operating one of the MOs (a first MO), or updating or referring to the table thereof when an operation is performed on the other MO (a second MO). An interface H shown in FIG. 5 is an example of this type of interface.

I. An interface for performing an operation reverse to that of an interface of the type H, that is, an interface used for operating the second MO, or updating or referring to the table thereof when an operation is performed on the first MO. An interface I shown in FIG. 5 is an example of this type of interface and performs an operation reverse to that of the interface H.

The interfaces E through G enable information setting in the managed apparatus 13. The interfaces E and F enable control of the managed apparatus. The interface G enables storage of information asynchronously transmitted from the managed apparatus 13 in the table. A method of realizing each of the interfaces E through G depends on a common database product. The following are examples of such methods:

(a) Interface E

The interface E is provided by realizing a route for communication between an access session from the user application 21 to the database or its MO and an access session from the protocol conversion part 25 to the MO since control of the managed apparatus 13 is performed as the extension of an operation by the user application 21.

In some database products, interprocess communication can be realized by using a pipe function. However, since access to a managed apparatus is required before processing by a user is completed transactionally, it is necessary to use a function enabling execution of processing before "Commit" processing to a database is completed.

(b) Interface F

When an operation is transmitted to the protocol conversion part 25 by the interface E, the interface F is used for returning to the MO side the result of the execution of the operation, or information obtained after the execution of the operation. The interface F can be realized by a stored procedure of a common database. The interface F is provided with information for relating a control by the interface E to a response thereto.

(c) Interface G

In the case of an asynchronous notification message from the managed apparatus 13, such as alarm information or a notification of a state change inside the managed apparatus 13), an event may be stored in the table of the MO by using an SQL statement such as "Insert" after the protocol conversion part 25 receives the event or by coding storage processing as a stored procedure.

Further, according to the present invention, the user application 21 can access the MOs 30 and 31 only by having the interfaces A through D for accessing the database 24 without using a special protocol since the MOs 30 and 31 are provided in the database 24. Methods of realizing the interfaces A through D are as follows:

(a) Interface A

Operations of "Select" (refer), "Insert", and "Update" in normal SQL statements are used. Since information on the managed apparatus 13 is stored in the table 32 inside the MO 30 by the interface G, the user application 21 can refer to the information as normal information in the table 32.

Further, in the case of modifying the information on the managed apparatus 13, either of the following two methods is employed. That is, with update of the information in the table 32 serving as a trigger, the operations of the interfaces E and F are performed either by the stored procedure 36 by using the interface B or by activating the stored procedure 36 by directly using the interface C.

(b) Interface B

A method of realizing the interface B depends on a database product, and in one case, the interface B is provided by using a database trigger. The database trigger is a function that declares execution of processing and automatically executes the stored procedure 36 before or after the update operation of the table 32 when the table 32 is updated ("Insert" or "Update" operation is performed).

(c) Interface C

The interface C, which is used for requesting the MO to perform a complicated operation or a plurality of operations simultaneously, is realized by a common stored procedure.

(d) Interface D

The interface D, which is used for notifying the user application 21 of a state of change inside the MO in such a case where an event asynchronously transmitted from the managed apparatus 13 is added to the table inside the MO, may be realized by several methods.

i) First Method

The user application 21 periodically reads out the state of the table inside the MO so as to obtain information when a change is recognized in the state. The change is checked by periodically using "Select" (refer) operation or the information on the change is obtained by periodically issuing the stored procedure.

ii) Second Method

Some database products can notify a user of a change in the database 24 by an "ALERT" function. By entering for "ALERT" notification in the table of the MO in advance on the user side, the user application 21 can asynchronously receive a change occurring inside the database 24.

iii) Third Method

Some database products are provided with a function that enables communication between a plurality of sessions with the database 24. By using that function, the user can be notified of a change inside the database 24.

According to the present invention, the MOs 30 and 31 are not provided separately from the database 24 as in the conventional method, but are provided inside the database 24. This enables the MOs 30 and 31 and the database 24 to share data, thus reducing an amount of communication and a total processing time. An increase in loads caused by providing an MO function and a database function in the same server can be avoided by increasing the processing power of the server by providing a plurality of processors therein.

Further, by providing the MOs 30 and 31 inside the database 24, the transaction functions of the MOs 30 and 31 can be realized by using the transaction function of the database 24 as it is. Thereby, no development of a new transaction function is required, thus resulting in reduced costs.

Next, a description will be given of a specific embodiment. Since a manipulation statement depends on a method of providing an MO inside a database product or on a programming language used, a description will be given in terms of logic.

FIG. 6 is a block diagram showing a second embodiment of the NMS 20 according to the present invention. In FIG. 6, the same elements as those of FIG. 4 are referred to by the same numerals. In FIG. 6, the NMS 20 is composed of the user application 21 as a client, such as the GUI, and the NMS server 22, and manages the managed apparatuses 13 such as transmission apparatuses. The NMS server 22 is composed of the database 24 and the protocol conversion part 25. The protocol conversion part 25 is a network element manager (an NE manager).

In this embodiment, a description will be given of a card class MO 40 provided inside the database 24, which card class MO 40 is taken as an example of an MO managing the managed apparatuses 13. Each managed apparatus 13 has a plurality of cards (packages) provided therein, and information for operating the cards is stored in a card table 41 inside the card class MO 40. Information on an event occurring in any of the cards, such as alarm information, is stored and managed in an event table 42 inside the card class MO 40. Further, stored procedures 43 and 44 are provided in the card table 41 and the event table 42, respectively.

In the following description, basically, only one of the managed apparatuses 13 will be referred to for convenience of description.

FIGS. 7A and 7B are diagrams showing schema definitions of the card table 41 and the event table 42, respectively. In FIG. 7A, a column name CARD_ID is a primary key identifying a package (that is, each of the packages), CARD_NAME is the name information of the package and exists only in the database 24, ALARM_INH is a flag as to whether to monitor the package, and ALARM_STATE shows a state of alarm of the package.

In FIG. 7B, a column name EVENT_ID is a primary key identifying a package (that is, each of the packages), EVENT_TIME is the time of occurrence of an event, CARD_ID is CARD_ID information corresponding to the event, EVENT_MODE is information on occurrence of or recovery from a failure, and EVENT_STATUS is information managing the state of the new event.

A description will be given of the stored procedure 43 of the card table 41. CARD_RESET is a method for performing a reset operation on a card and is declared by the stored procedure 43 so as to control only the actual managed apparatus 13.

CARD_ALARM_MODE as the interface C is information determining whether to monitor the failure information of a card. Since this information is to be set in the actual managed apparatus 13, a method for changing ALARM_MODE in the card table 41 is defined after a control operation is performed to set the information in the managed apparatus 13.

SET_RESPONSE as the interface C is a method for returning the result of an operation by CARD_RESET from the protocol conversion part 25.

A description will be given of the stored procedure 44 of the event table 42. CHECK_EVENT as the interface D is a method for checking occurrence of a new event.

Figure 8:
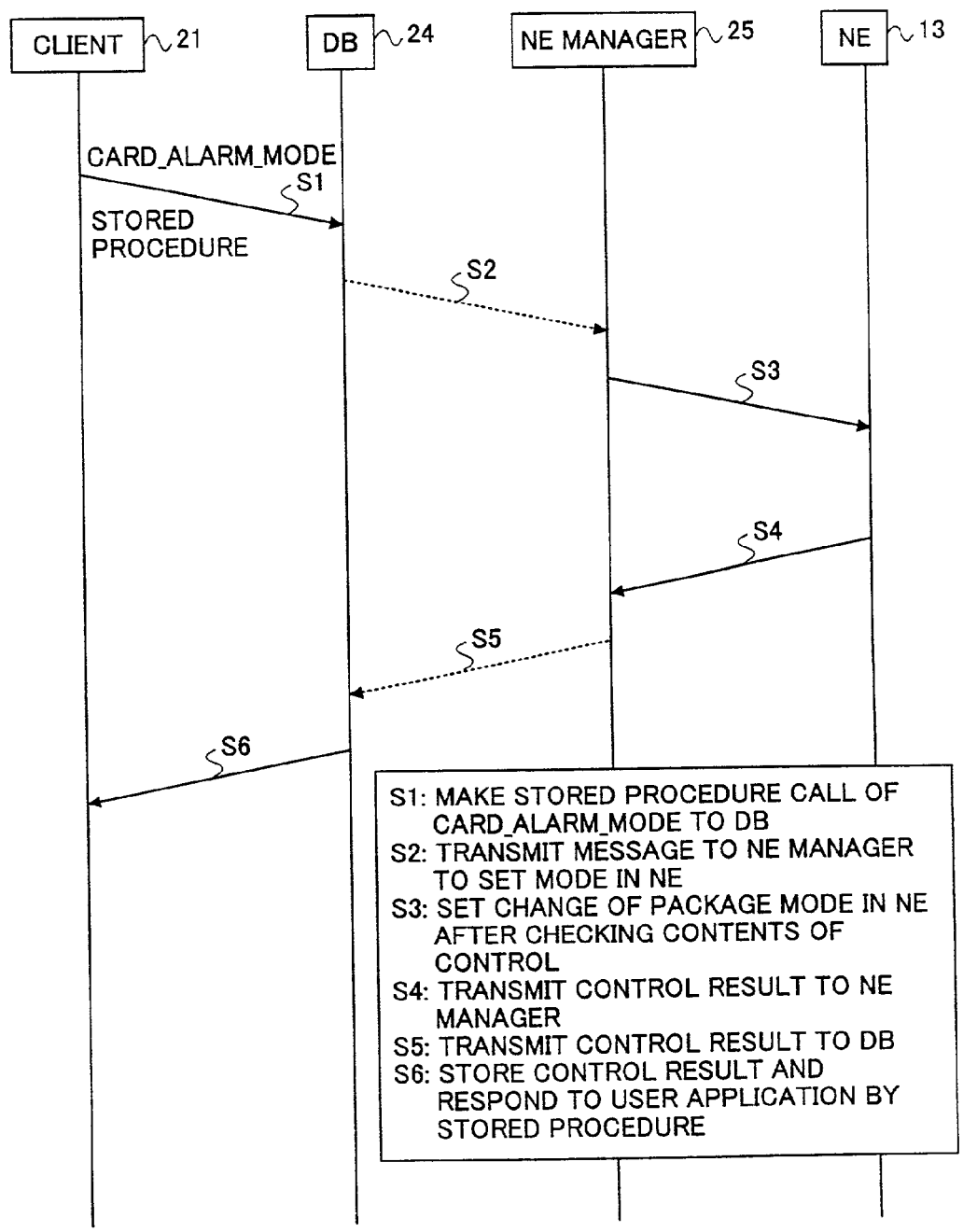
FIG. 8 is a flowchart of an operation performed by a user application of changing an ALARM_INH mode and controlling a managed apparatus accordingly.

Next, a description will be given of an actual operation of the NMS 20. First, a description will be given, with reference to the operation flow of FIG. 8, of a case where an operation is performed by the user application 21 of changing an ALARM_INH mode and controlling the managed apparatus (network element; NE) 13 accordingly.

In step S1, the user application (client) 21 controls the database 24 by using the stored procedure 43 of CARD_ALARM_MODE.

CARD_ALARM_MODE (1120, 1, 0, RSP)
TRX_ID=1120 (transaction ID)
CARD_ID=1 (package ID)
INH_MODE=0 (0:NOR, 1:INH)
The operation is normally completed if a response result RSP is 0, and is failed if the RSP is 1 or 2.

In step S2, in the stored procedure 43 of CARD_ALARM_MODE requested by the user application 21, a message storing the CARD_ID and INH_MODE is transmitted to the protocol conversion part 25 that is the network manager, requesting the INH_MODE to be set in the managed apparatus 13. Then, the MO 40 awaits the result of the request by using another message pipe.

In step S3, receiving the message from the MO 40 inside the database 24, the protocol conversion part 25, which has awaited the control request message, checks the contents of the control and the instance included in the received message and executes control of the actual managed apparatus 13.

In step S4, the protocol conversion part 25 receives the result of the control from the managed apparatus 13, and in step S5, returns information on the result of the control to the MO 40 by the stored procedure 43 by using SET_RESPONSE.

In step S6, if the result shows that the control is normally completed, the database 24 is updated and responds to the user application 21.

Figure 9:
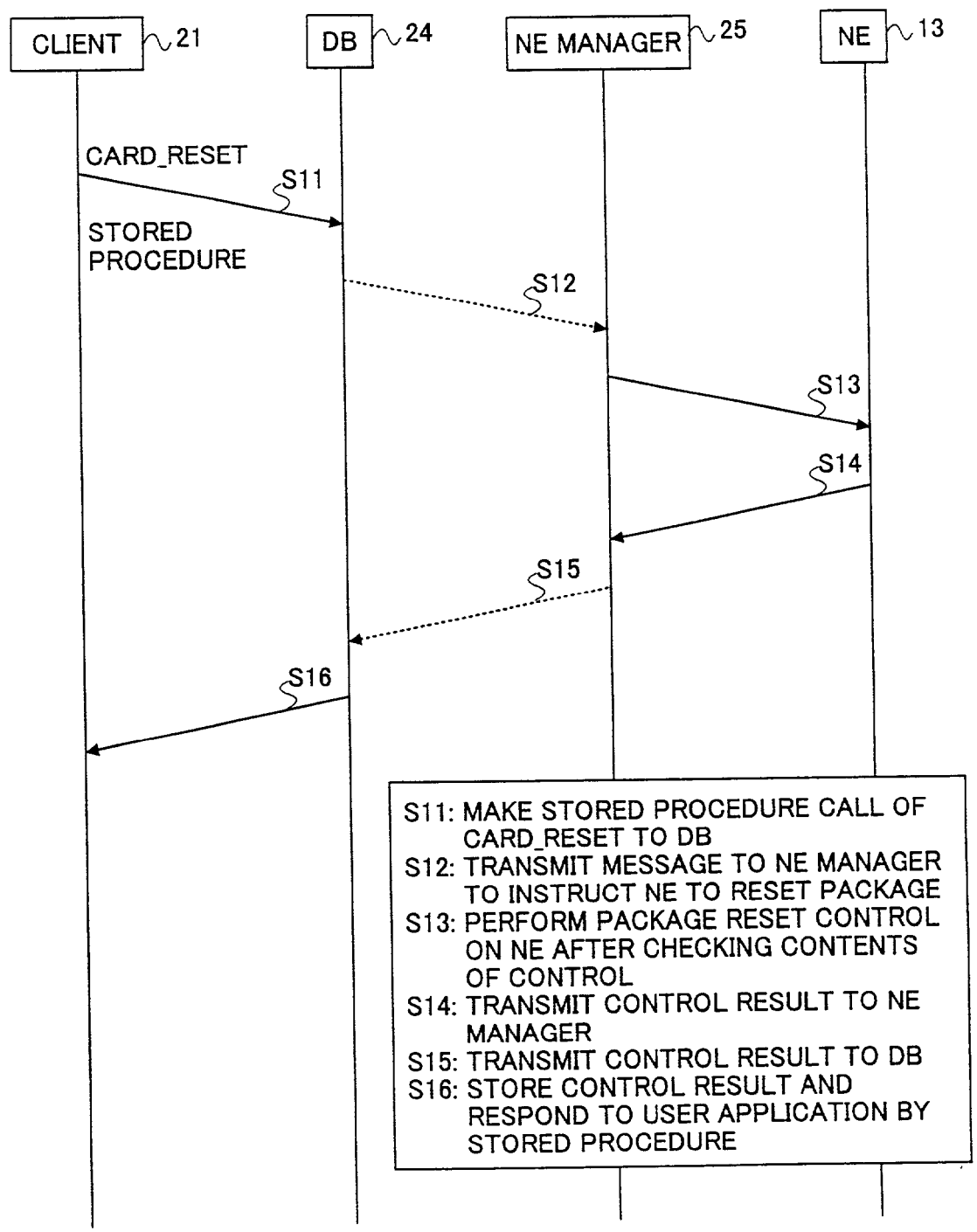
FIG. 9 is a flowchart of an operation performed by the user application of resetting a card of the managed apparatus.

Next, a description will be given, with reference to the operation flow of FIG. 9, of a case where a control operation is performed by the user application 21 of resetting a card of the managed apparatus 13.

In step S11, the user application 21 controls the database 24 by using the stored procedure 43 of CARD_RESET.

CARD_RESET (1130, 2, RSP)
TRX_ID=1130 (transaction ID)
CARD_ID=2 (package ID)

The operation is normally completed if a response result RSP is 0, and is failed if the RSP is 1 or 2.

In step S12, in the stored procedure 43 of CARD_RESET requested by the user application 21, a message storing the CARD_ID is transmitted to the protocol conversion part 25, requesting the managed apparatus 13 to be reset. Then, the MO 40 awaits the result of the request by using another message pipe.

In step S13, receiving the message from the MO 40 inside the database 24, the protocol conversion part 25, which has awaited the control request message, checks the contents of the control and the instance included in the received message and executes control of the actual managed apparatus 13.

In step S14, the protocol conversion part 25 receives the result of the control from the managed apparatus 13, and in step S15, returns information on the result of the control to the MO 40 by the stored procedure 43 by using SET_RESPONSE.

In step S16, the database 24 responds to the user application 21.

Before the above-described operation is performed, the message pipes are provided between the database 24 and the protocol conversion part 25 so that messages are bilaterally exchangeable therebetween in steps S12 and S15.

Figure 10:
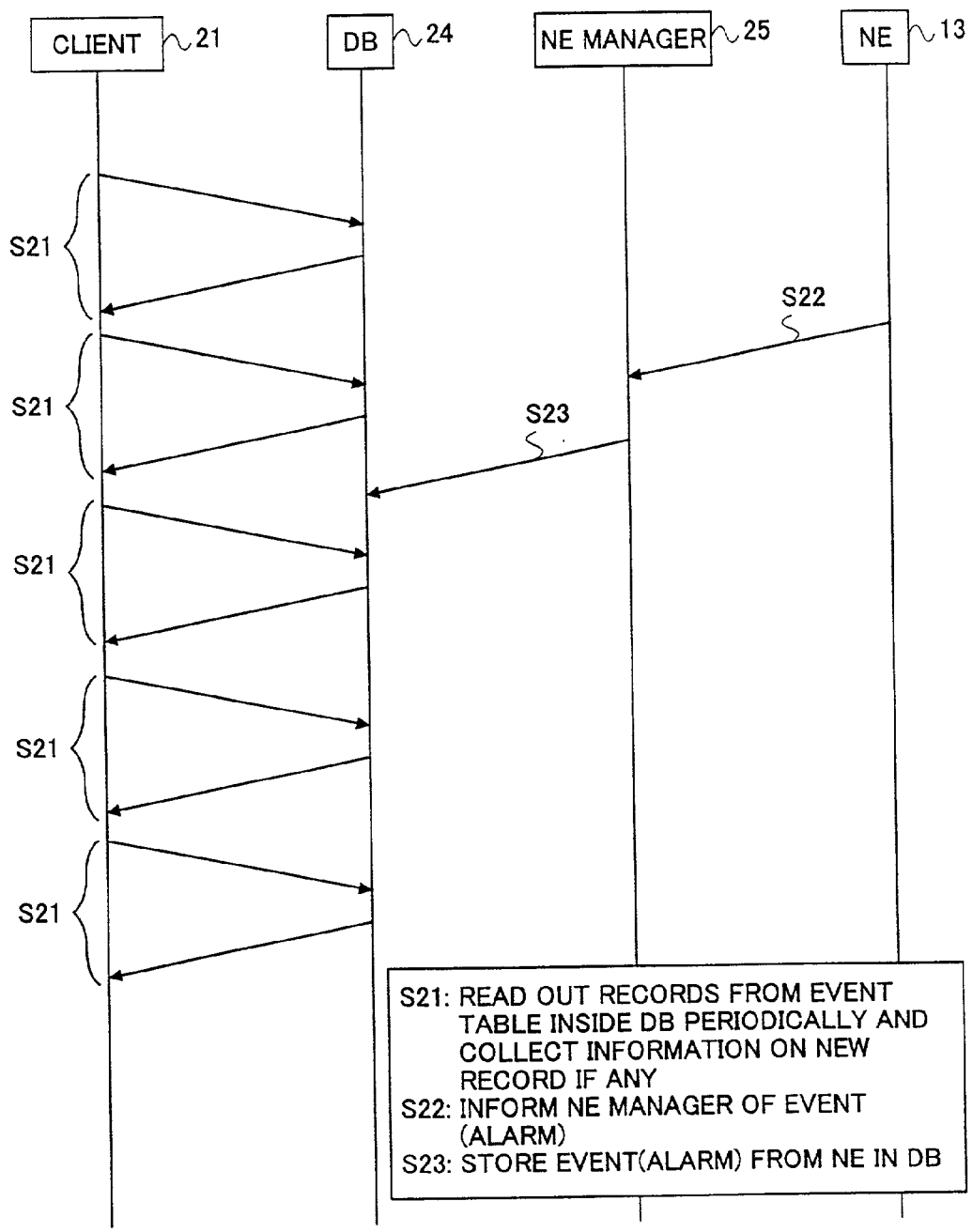
FIG. 10 is a flowchart of an operation of recognizing alarm information from the managed apparatus by the user application.

Next, a description will be given, with reference to the operation flow of FIG. 10, of a case where the user application 21 recognizes alarm information from the managed apparatus 13.

In step S21, the user application 21 checks a new event (alarm) by using the stored procedure 44 of CHECK_EVENT. If an RSP is 1, the user application 21 reads out each record whose EVENT_STATUS is 1 from the event table 42.

SELECT EVENT_ID, EVENT_TIME, CARD_ID, EVENT MODE
FROM EVENT_TBL
WHERE EVENT_STATUS=1;

The user application 21 checks the EVENT_ID of each received event and updates the EVENT_STATUS of each received event to 0 so as to indicate in the event table 42 that the received events are read.

While step S21 is performed periodically, in step S22, the managed apparatus 13 asynchronously transmits a message to the protocol conversion part 25, and in step S23, the protocol conversion part 25 inserts the transmitted message into the event table 42.

INSERT INTO EVENT_TBL (EVENT_TIME, CARD_ID, EVENT_MODE)
VALUES (2000.09.30 13:00:15, 1, MAJ);

At this point, by the stored procedure 44 triggered off by a database trigger inside the database 24, an EVENT_ID is automatically provided to the new event by a database trigger executed automatically when the protocol conversion part 25 stores the new event in the event table 42.

Further, the stored event is provided with an EVENT_STATUS showing that the stored event is a new event.

Furthermore, the ALARM_STATE of the record of the CARD_ID of the stored event in the card table 41 inside the same database trigger is updated. The ALARM_STATE is set to 1 in the case of MAJ and to 0 in the case of CLR.

Figure 11:
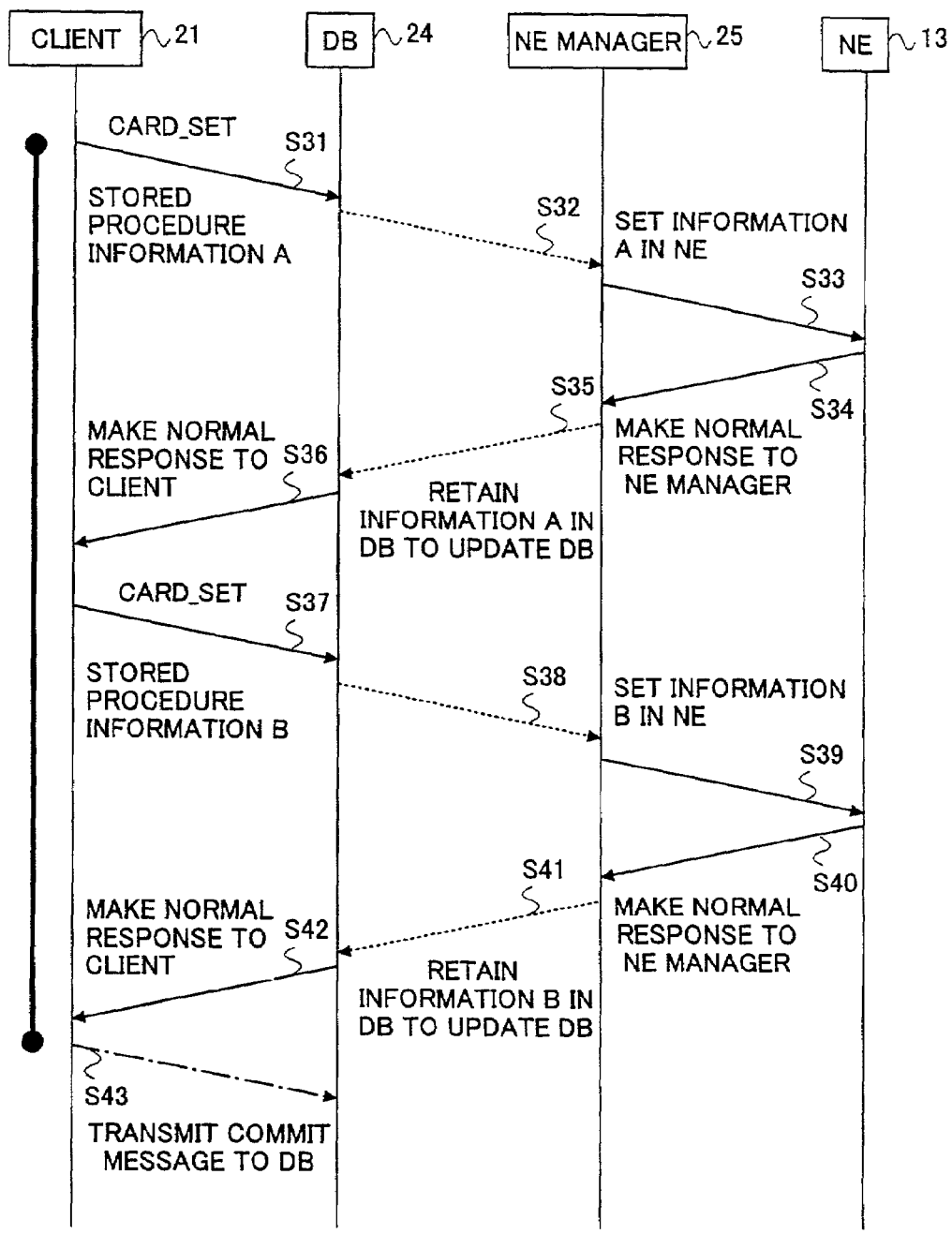
FIG. 11 is a flowchart of an operation performed by the user application of setting information in a card of the managed apparatus in a case of normal completion.

Next, a description will be given, with reference to the operation flow of FIG. 11, of a case where the user application 21 performs information setting control on a card of the managed apparatus 13.

In step S31, the user application 21 controls the database 24 by using the stored procedure 43 of CARD_SET inside the database 24, and in step S32, transmits a message to the protocol conversion part 25 by the stored procedure 43, requesting parameter-storing information A to be set in the managed apparatus 13. In step S33, the protocol conversion part 25 sets the information A included in the received message in the managed apparatus 13. If, in step S34, the managed apparatus 13 makes a normal response to the protocol conversion part 25, in step S35, the protocol conversion part 25 temporarily retains the set information A in the database 24 so as to update the database 24. Then, in step S36, the database 24 makes a normal response to the user application 21.

In step S37, receiving the normal response from the database 24, the user application 21 controls the database 24 by using the stored procedure 43 of CARD_SET inside the database 24, and in step S38, transmits a message to the protocol conversion part 25 by the stored procedure 43, requesting parameter-storing information B to be set in the managed apparatus 13. In step S39, the protocol conversion part 25 sets the information B included in the received message in the managed apparatus 13. If, in step S40, the managed apparatus 13 makes a normal response to the protocol conversion part 25, in step S41, the protocol conversion part 25 temporarily retains the set information B in the database 24 so as to update the database 24. Then, in step S42, the database 24 makes a normal response to the user application 21. In step S43, the user application 21 transmits a commit message to the database 24.

Thus, the user application 21 treats the above-described two operations as one transaction, and is enabled to transmit the commit message to the database 24 when the user application 21 receives the normal response to each of the operations. The database 24 actually replaces corresponding existing data with the data of the information A and B at the timing of the transmission of the commit message. In steps S32 through S35 and S38 through S41, control operations are performed outside the database 24 while the transaction is not completed.

Figure 12:
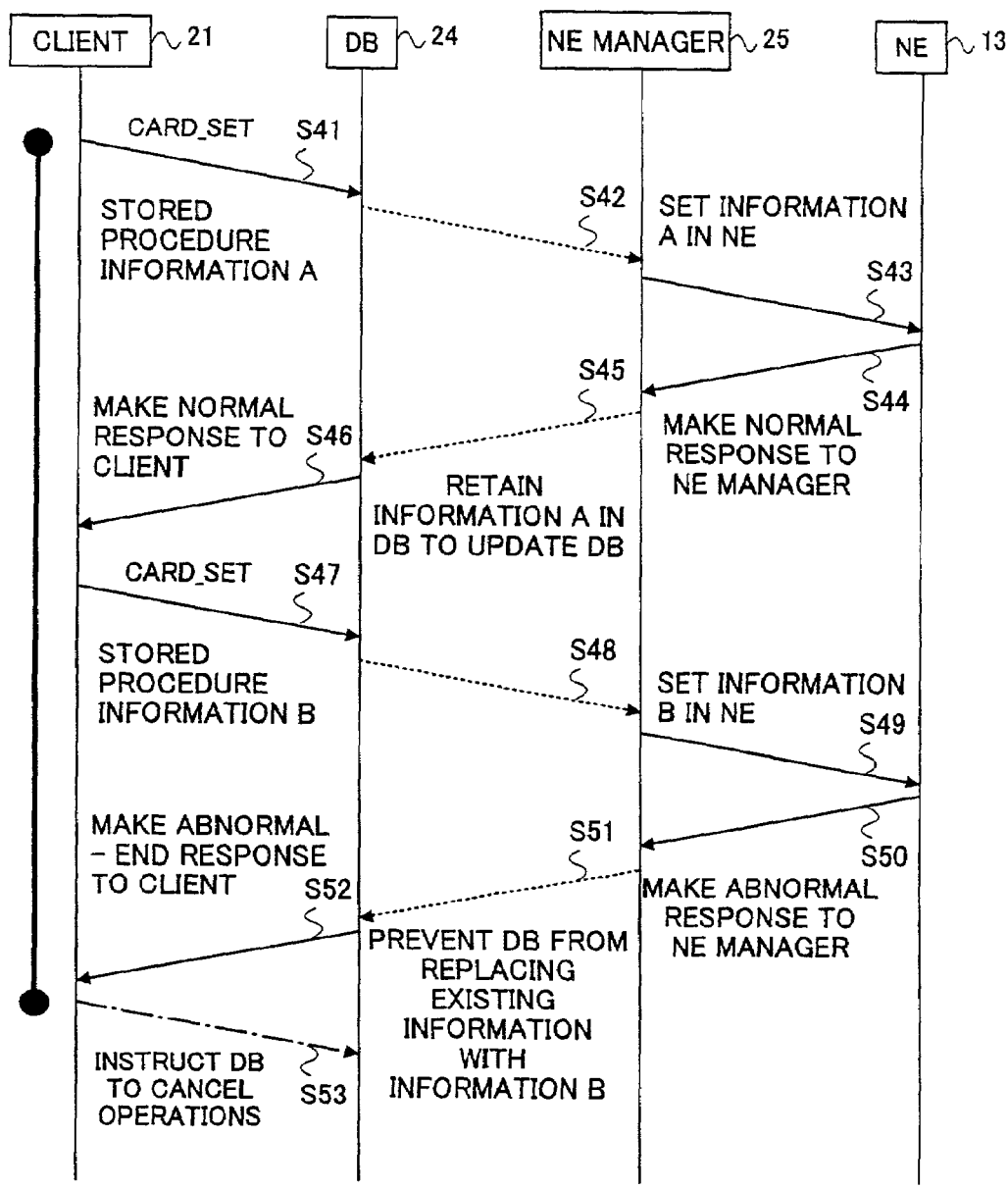
FIG. 12 is a flowchart of an operation performed by the user application of setting information in a card of the managed apparatus in a case of an abnormal end.

Next, a description will be given, with reference to the operation flow of FIG. 12, of a case of an abnormal end, that is, a case where the user application 21 performs information setting control on a card of the managed apparatus 13 but fails to complete the transaction normally.

In step S41, the user application 21 controls the database 24 by using the stored procedure 43 of CARD_SET inside the database 24, and in step S42, transmits a message to the protocol conversion part 25 by the stored procedure 43, requesting parameter-storing information A to be set in the managed apparatus 13. In step S43, the protocol conversion part 25 sets the information A included in the received message in the managed apparatus 13. If, in step S44, the managed apparatus 13 makes a normal response to the protocol conversion part 25, in step S45, the protocol conversion part 25 temporarily retains the set information A in the database 24 so as to update the database 24. Then, in step S46, the database 24 makes a normal response to the user application 21.

In step S47, receiving the normal response from the database 24, the user application 21 controls the database 24 by using the stored procedure 43 of CARD_SET inside the database 24, and in step S48, transmits a message to the protocol conversion part 25 by the stored procedure 43, requesting parameter-storing information B to be set in the managed apparatus 13. In step S49, the protocol conversion part 25 sets the information B included in the received message in the managed apparatus 13. If, in step S50, the managed apparatus 13 makes an abnormal response to the protocol conversion part 25, in step S51, the protocol conversion part 25 is prevented from replacing corresponding existing information in the database 24 with the set information B. Then, in step S52, the database 24 makes an abnormal-end response (a response indicating an abnormal end) to the user application 21. In step S53, the user application 21 instructs the database 24 to cancel the requested operations.

Thus, the user application 21 treats the above-described two operations as one transaction, and instructs the database 24 to cancel the operations since the user application 21 receives the abnormal-end response to the second operation. Further, since the database 24 cancels the series of operations, the information A is prevented from being set in the database 24 so that the contents of the database 24 remain the same without being updated.

In the above-described case, it is not required to perform further operation on the managed apparatus 13. However, if it is necessary to replace the information A set in the database 24 with the original (previous) information, the user application 21 again performs control on the database 24 after step S53 so as to replace the information A set in the database 24 with the original information, and instructs the database 24 to cancel the operation after receiving a response to the operation.

Next, a description will be given, with reference to the operation flow of FIG. 13, of a case where a plurality of user applications operate in the same transaction. The operation flow of FIG. 13 is described in the same sequence as that of FIG. 11.

When a plurality of user applications (clients) 21a and 21b performs operations on the same card of the managed apparatus 13, the operations are performed on the same resource in the database 24. Therefore, if the user application 21a starts performing its operation prior to the user application 21b, for instance, the user application 21b is locked by a function of the database 24 to be kept waiting to perform its operation while the user application 21a performs its operation. Any operation to be performed on the same resource is kept waiting while the user application 21a performs its operation.

Figure 13:
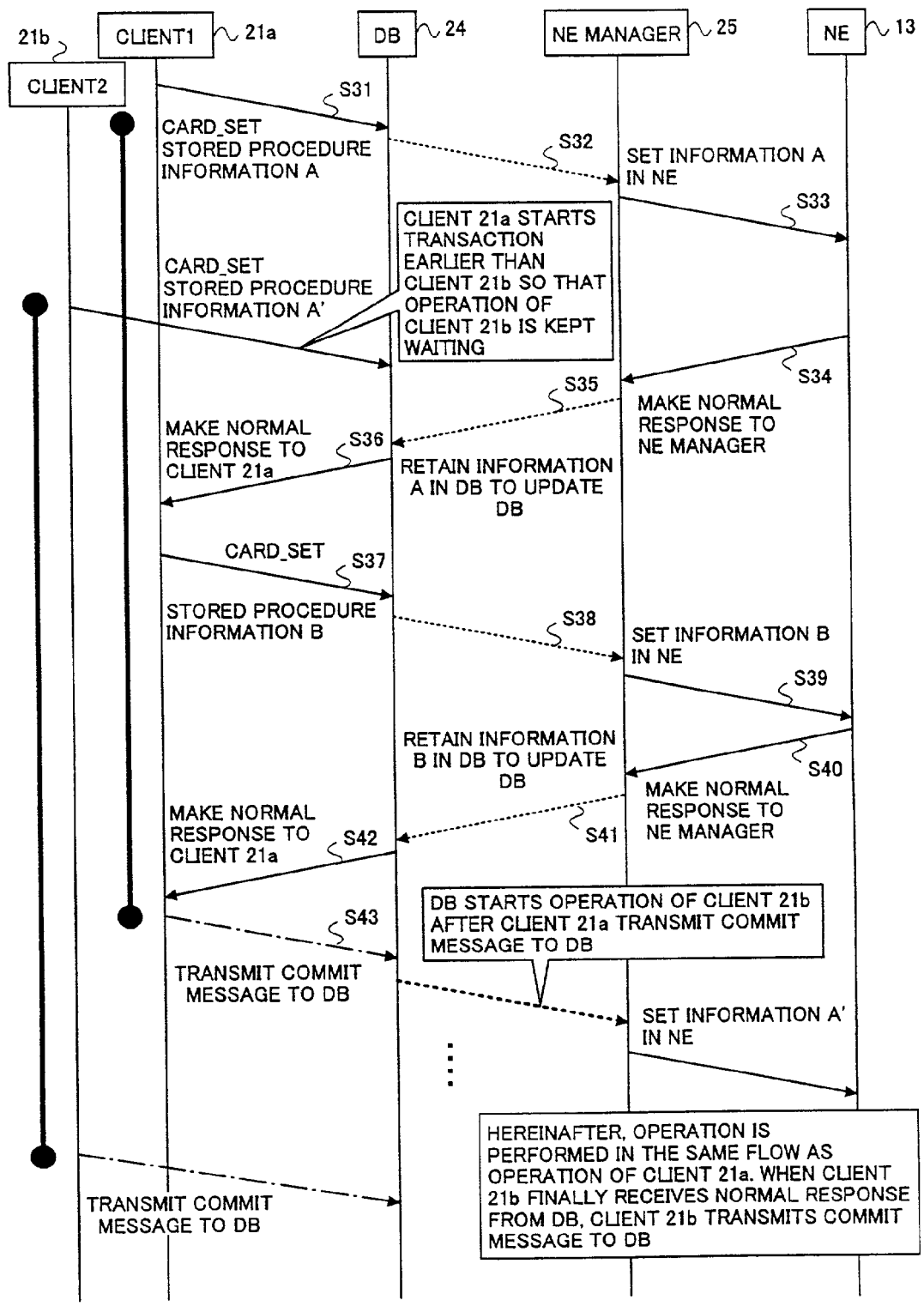
FIG. 13 is a flowchart of an operation of having a plurality of user applications operate in the same transaction.

In FIG. 13, the operation by the user application 21b is kept waiting after the user application 21b requests the database 24 to perform the operation. After the operation of the user application 21a is completed, the operation of the user application 21b can be performed. That is, the operation of the user application 21b can be performed if it is determined that the operation of the user application 21b is performable as a result of checking the performability of the operation inside the database 24. However, if both user applications 21a and 21b request the database 24 to delete the resource, one of the user applications 21a and 21b which one makes the request later than the other one receives an error response from the database 24 after waiting since the resource has already been deleted and does not exist. That is, it depends on the type of transaction whether the transaction of each of the user applications 21a and 21b is processed by parallel processing after waiting or receives an error response.

Next, a further detailed description will be given of the protocol conversion part 25. The protocol conversion part 25 is a processing part that periodically accesses the database 24 to check a request to perform an operation on the managed apparatus 13 and converts information on the request into a format (protocol) for performing the operation on the actual managed apparatus 13. On the other hand, the protocol conversion part 25 receives a response or an asynchronous event notification from the managed apparatus 13 and stores the received response or notification in the database 24.

The protocol conversion part 25 accesses the database 24 by using the operational grammar (query language) of the database 24, and performs an operation on the managed apparatus 13 by using a protocol for connection therewith. A description will be given, for instance, of a case where the common management information protocol (CMIP) is used for connection with the managed apparatus 13. The following operations exist in the CMIP as main operation protocols:

A. m-set: Operation of setting information in a managed apparatus;

B. m-get: Operation of reading out information from a managed apparatus;

C. m-action: Operation of performing an operation on a managed apparatus;

D. m-create: Operation of instructing a managed apparatus to generate a resource;

E. m-delete: Operation of instructing a managed apparatus to delete a resource; and as an operation performed by a receiver of an asynchronous notification from a managed apparatus, F. m-event-report: Operation of asynchronously receiving an event notification from a managed apparatus.

Each of the above-described operations A through F is provided with address information for identifying a managed apparatus to be operated. The address information is domain name information and is actually composed of class information and instance information. Further, the operation C (m-action) is provided with action information, the operation B (m-get) is provided with an attribute identifier, or information on which information to read out, and the operation A (m-set) is provided with an attribute value, or information on which value to set.

The protocol conversion part 25 converts information transmitted from the database 24 into the protocol for communication with the managed apparatus 13 so as to access the managed apparatus based on the transmitted information, thereby performing an operation. Further, the protocol conversion part 25 awaits a response from the managed apparatus 13 by the protocol, converts the result of the operation into the grammar of the database 24, and stores the converted result in the database 24. The protocol conversion part 25 uses a library for protocol conversion with the managed apparatus 13, or for an operation of actually accessing the managed apparatus 13.

In the case of performing an operation of CARD_ALARM_MODE, for instance, the protocol conversion part 25 sets the state of ALARM_MODE in the managed apparatus 13. That is, the protocol conversion part 25 stores information (operation information, address information of the managed apparatus 13, and changed information value) received from the database 24 in a command of m-set as parameters and performs the operation on the managed apparatus 13. The information transmitted from the database 24 is as follows:

CARD_ALARM_MODE
TRX_ID=1120
CARD_ID=1
INH_MODE=0

An operation protocol for communication with the managed apparatus 13 is as follows:

m-set (card class, card address information: 1, attribute: INH_MODE, attribute value: 0)

In the case of performing an operation of CARD_RESET, the protocol conversion part 25 stores information (operation information, address information of the managed apparatus 13, and changed information value) received from the database 24 in a command of m-action as parameters and performs the operation of CARD_RESET on the managed apparatus 13. The information transmitted from the database 24 is as follows:

CARD_RESET
TRX_ID=1130
CARD_ID=2

An operation protocol for communication with the managed apparatus 13 is as follows:

m-action (card class, and card address information: 2)

The interfaces D, E, F, and G may be referred to as an event notification interface, a control interface, a result notification interface, and a change notification interface, respectively. Further, a CHECK statement (CHECK_EVENT) is an operation statement for operating the MO of a query language for posing a query to the database 24, and a SELECT statement is a reference statement of the query language.

The present invention is not limited to the specifically disclosed embodiments, but variations and modifications may be made without departing from the scope of the present invention.

The present application is based on Japanese priority application No. 2001-262358 filed on Aug. 30, 2001, the entire contents of which are hereby incorporated by reference.

What is claimed is:

1. An apparatus including a processor for managing a state of an external apparatus connected thereto, comprising:
a database;
a plurality of managed objects (MOs);
each managed object (MO) of the plurality of managed object managing the state of the external apparatus, said each MO being provided in said database and realized by an application, said each MO having a table storing information on the state of the external apparatus, a stored procedure defining a method related to the table and a notification of a state change;
a control interface through which a MO of the plurality of managed objects performs outer control of the external apparatus from said database, the interface being provided in said MO;
a protocol conversion part converting the information in a first protocol into a second protocol for transmitting the information between said database and the external apparatus, wherein the control interface establishes an interface between the MO and the protocol conversion part;
the protocol conversion part further receiving a result of outer control from the external apparatus, converting the result into grammar of said database, returning information on the result of the outer control to said MO by the stored produced and if the result shows that the outer control is completed, said database is updated and responses to the application; and
a result notification interface for notifying said database of the result of the outer control performed by said MO with a result being correlated with the outer control, the result notification interface being provided in said MO.

2. The apparatus as claimed in claim 1, further comprising a change notification interface for notifying said MO of a change in the state of the external apparatus, the change notification interface being provided in said MO.

3. The apparatus as claimed in claim 1, wherein said database and said protocol conversion part comprise a server computer managing the external apparatus.

4. The apparatus as claimed in claim 3, wherein said MO performs outer control or a notification is transmitted to said MO from outside before said database completes transaction processing requested by a user application connected to the apparatus.

5. The apparatus as claimed in claim 4, further comprising an event notification interface for notifying the user application of an event, the event notification interface being provided in said MO.

6. The apparatus as claimed in claim 4, wherein an operation statement for operating said MO is provided in a query language for posing a query to said database from the user application.

7. The apparatus as claimed in claim 4, wherein said MO is operated by using a reference statement of a query language for posing a query to said database front the user application.

8. The apparatus as claimed in claim 1, wherein said control interface is provided with a function of extending transaction processing in said database.

9. The apparatus as claimed in claim 1, wherein control of establishing a session with said database is extended so that operations of a plurality of users are performed as one transaction.

10. A method of managing a state of an external apparatus, comprising:
providing a plurality of managed objects (MOs);
realizing each managed object (MO) of the plurality of MOs by an application, wherein said each MO being provided in a database, and said each MO having a table storing information on the state of the external apparatus, a stored procedure defining a method related to the table and a notification of a state change;
managing the state of the external apparatus by a MO of the MOs;
storing the state of the external apparatus in the database;

performing outer control of the external apparatus by the MO from said database through a control interface, the control interface being provided in the MO;

converting the information in a first protocol into a second protocol for transmitting the information between said database and the external apparatus, wherein the control interface establishes an interface between the MO and a protocol conversion part, said protocol conversion part further receiving a result of outer control from the external apparatus, converting the result into grammar of the database, returning information on the result of the outer control to the MO by the stored produced and if the result shows that the outer control is completed, the database is updated and responses to the application; and notifying the database of the result of the outer control performed by the MO with a result being correlated with the outer control via a result notification interface being provided in the MO.

11. The method as claimed in claim 10, wherein the MO is notified of a change in the state of the apparatus provided external to the database via a change notification interface provided in the MO.

12. The method as claimed in claim 10, wherein a server computer comprising the database and the protocol conversion part manages the apparatus connected to the server computer.

13. The method as claimed in claim 12, wherein the MO performs outer control or a notification is transmitted to the MO from outside before the database completes transaction processing requested by a user application connected to the server computer.

14. The method as claimed in claim 13, wherein the user application is notified of an event via an event notification interface provided in the MO.

15. The method as claimed in claim 13, wherein an operation statement for operating the MO is provided in a query language for posing a query to the daxabase from said user application.

16. The method as claimed in claim 13, wherein the MO is operated by using a reference statement of a query language for posing a query to the database from the user application.

17. The method as claimed in claim 10, wherein the control interface is provided with a fUnction of extending transaction processing in the database.

18. The method as claimed in claim 10, wherein control of establishing a session with the database is extended so that operations of a plurality of users are performed as one transaction.

* * * * *